(12) United States Patent
Cheong et al.

(10) Patent No.: US 8,995,378 B2
(45) Date of Patent: Mar. 31, 2015

(54) APPARATUS AND METHOD FOR ALLOCATING CHANNEL IN COMMUNICATION SYSTEM

(71) Applicant: Electronics and Telecommunications Research Inst, Daejeon (KR)

(72) Inventors: Min-Ho Cheong, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 136 days.

(21) Appl. No.: 13/717,633

(22) Filed: Dec. 17, 2012

(65) Prior Publication Data

US 2013/0188571 A1     Jul. 25, 2013

(30) Foreign Application Priority Data

Dec. 15, 2011  (KP) .......................... 10-2011-0135642
Dec. 15, 2011  (KR) .......................... 10-2011-0135592
Dec. 16, 2011  (KR) .......................... 10-2011-0136402

(51) Int. Cl.
*H04W 4/00* (2009.01)
*H04W 72/04* (2009.01)
*H04W 28/04* (2009.01)
*H04W 84/12* (2009.01)

(52) U.S. Cl.
CPC .......... *H04W 72/0453* (2013.01); *H04W 28/04* (2013.01); *H04W 72/042* (2013.01); *H04W 84/12* (2013.01)
USPC ....................................................... 370/329

(58) Field of Classification Search
USPC ......... 370/329, 252, 330, 343, 436, 295, 319, 370/336, 344, 480, 481; 455/63.1, 450, 455/452.1, 509, 67.13, 452.2, 114.2, 115.1, 455/454, 464; 375/132, 355; 348/E7.024
See application file for complete search history.

(56) References Cited

U.S. PATENT DOCUMENTS

| | | | |
|---|---|---|---|
| 2007/0081485 A1* | 4/2007 | Li | 370/328 |
| 2008/0176577 A1* | 7/2008 | Bourlas et al. | 455/454 |
| 2010/0091701 A1* | 4/2010 | Youn et al. | 370/328 |
| 2010/0177757 A1 | 7/2010 | Kim et al. | |
| 2010/0273502 A1* | 10/2010 | Uemura et al. | 455/452.2 |
| 2010/0317356 A1* | 12/2010 | Roessel et al. | 455/450 |
| 2013/0084821 A1* | 4/2013 | Kapoor et al. | 455/307 |
| 2013/0188571 A1* | 7/2013 | Cheong et al. | 370/329 |

FOREIGN PATENT DOCUMENTS

| | | |
|---|---|---|
| KR | 10-0728356 B1 | 6/2007 |
| KR | 1020100041235 A | 4/2010 |
| KR | 1020100084141 A | 7/2010 |
| WO | WO 2010/044580 A2 | 4/2010 |

* cited by examiner

Primary Examiner — Phuongchau Ba Nguyen

(57) ABSTRACT

A channel allocation apparatus in a communication system includes: a receiving unit configured to receive terminal information containing transmission mode information of a plurality of stations (STAs) from the STAs; a checking unit configured to check transmission modes of the STAs and check a frequency band available for the STAs; an allocating unit configured to allocate channels of an allocable frequency band in the available frequency band to the STAs, according to the transmission modes of the STAs; and a transmitting unit configured to transmit channel allocation information on the channels allocated to the STAs to the STAs.

18 Claims, 7 Drawing Sheets

APPARATUS AND METHOD FOR ALLOCATING CHANNEL IN COMMUNICATION SYSTEM

CROSS-REFERENCES TO RELATED APPLICATIONS

The present application claims priority of Korean Patent Application Nos. 10-2011-0135592, 10-2011-0135642, and 10-2011-0136402, filed on Dec. 15, 2011, Dec. 15, 2011, and Dec. 16, 2011, respectively, which are incorporated herein by reference in their entirety.

BACKGROUND OF THE INVENTION

1. Field of the Invention

Exemplary embodiments of the present invention relate to a communication system; and, more particularly, to a channel allocation apparatus and method which allocates channels in consideration of transmission modes between a base station, for example, an access point (hereafter, referred to as 'AP') and a plurality of terminals, for example, stations (hereafter, referred to as 'STAs'), and which minimizes channel interference of the channels allocated to the STAs during the channel allocation.

2. Description of Related Art

In a current communication system, research has been actively conducted to provide various qualities of services (hereafter, referred to as 'QoS') of services having a high transmission rate to users. Examples of the communication system may include a wireless local area network (hereafter, referred to as 'WLAN') system. In the WLAN system, research has been actively conducted on a variety of methods for stably transmitting large-volume data at high speed through limited resources. Particularly, in a communication system, research has been conducted on data transmission through wireless channels. Recently, in the WLAN system, there have been proposed a variety of methods for normally transmitting and receiving large-volume data by effectively using limited wireless channels.

Meanwhile, in a current communication system, there have been proposed a variety of methods for transmitting and receiving large-volume data to a plurality of users by effectively using limited frequency channels. Particularly, in a current WLAN system, there have been proposed methods for normally transmitting and receiving data by effectively using limited frequency channels, when a base station, for example, an access point (hereafter, referred to as 'AP') and a plurality of terminals corresponding to a plurality of users, for example, stations (hereafter, referred to as 'STAs') transmit and receive large-volume data through the limited frequency channels.

In the current WLAN system, however, when the limited frequency channels are allocated to the plurality of STAs and large-volume data are then transmitted and received through the allocated frequency channels, transmission methods between the AP and the STAs, that is, transmission modes are different for the respective STAs, and a specific method for allocating frequency channels to the STAs according to the respective transmission modes of the STAs has not yet been proposed. Furthermore, when channel interference occurs in the channels allocated to the STAs, data may not be normally transmitted and received due to the channel interference.

Therefore, there is a demand for a method for allocating channels to a plurality of STAs in consideration of transmission modes of the STAs, when large-volume data are transmitted and received through limited frequency channels between an AP and the STAs in a communication system, for example, a WLAN system. Furthermore, there is a demand for a channel allocation method for normally transmitting and receiving data by minimizing channel interference in the frequency channels allocated to the plurality of STAs.

SUMMARY OF THE INVENTION

An embodiment of the present invention is directed to a channel allocation apparatus and method in a communication system.

Another embodiment of the present invention is directed to a channel allocation apparatus and method for normally transmitting and receiving large-volume data by minimizing channel interference in frequency channels for transmitting large-volume data in a communication system.

Another embodiment of the present invention is directed to a channel allocation apparatus and method for allocating limited frequency channels to a plurality of STAs by considering transmission modes of the STAs in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a channel allocation apparatus in a communication system includes: a receiving unit configured to receive terminal information containing transmission mode information of a plurality of STAs from the STAs; a checking unit configured to check transmission modes of the STAs and check a frequency band available for the STAs; an allocating unit configured to allocate channels of an allocable frequency band in the available frequency band to the STAs, according to the transmission modes of the STAs; and a transmitting unit configured to transmit channel allocation information on the channels allocated to the STAs to the STAs.

In accordance with another embodiment of the present invention, a channel receiving apparatus in a communication system includes: a receiving unit configured to receive an interference signal corresponding to channel interference of a plurality of STAs; a generating unit configured to generate interference information corresponding to the interference signal and terminal information containing transmission mode information of the STAs; and a transmitting unit configured to transmit the terminal information to an access point (AP), wherein the receiving unit receives channel allocation information on channels of a frequency band allocated to the STAs according to the interference information and the transmission mode information, in a frequency band available for the STAs.

In accordance with another embodiment of the present invention, a channel allocation method in a communication system includes: receiving terminal information containing transmission mode information of a plurality of STAs from the STAs; checking transmission modes of the STAs and checking a frequency band available for the STAs; allocating channels of an allocable frequency band to the STAs in the available frequency band according to the transmission modes of the STAs; and transmitting channel allocation information on the channels allocated to the STAs to the STAs.

In accordance with another embodiment of the present invention, a channel receiving method in a communication system includes: receiving an interference signal corresponding to channel interference of a plurality of STAs; generating interference information corresponding to the interference signal and terminal information containing transmission mode information of the STAs; and transmitting the terminal information to an AP, wherein said receiving the interference signal corresponding to the channel interference of the plurality of STAs includes receiving channel allocation information on channels of a frequency band allocated to the STAs in a frequency band available for the STAs according to the interference information and the transmission mode information.

DESCRIPTION OF SPECIFIC EMBODIMENTS

Figure 1:
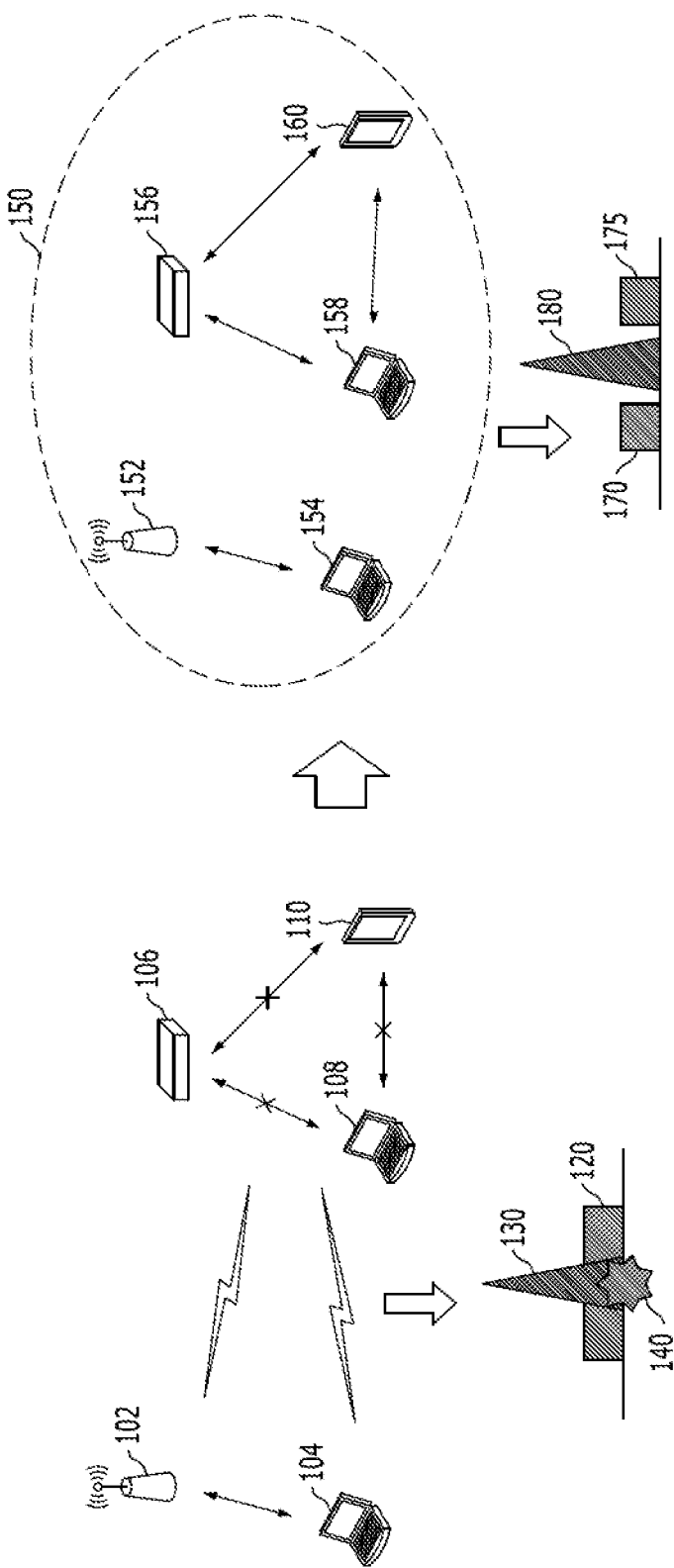
FIG. 1 schematically illustrates the architecture of a communication system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The embodiments of the present invention provide a channel allocation apparatus and method in a communication system, for example, a WLAN system. In the embodiments of the present invention, the WLAN system will be taken as an example for description. However, the channel allocation apparatus and method in accordance with the embodiments of the present invention may be applied to other communication systems.

Furthermore, the embodiments of the present invention provide an apparatus and method for allocating frequency channels in IEEE 802.11 systems as a communication system, for example, a WLAN system. The channel allocation apparatus and method in accordance with the embodiments of the present invention may minimize channel interference in frequency channels which are allocated to a plurality of terminals, for example, stations (referred to as 'STAs') corresponding to a plurality of users in a communication system, for example, a WLAN system in order to transmit and receive large-volume data. In the communication system in accordance with the embodiments of the present invention, frequency channels for data transmission and reception between a base station, for example, an access point (referred to as 'AP') and a plurality of STAs are allocated. At this time, as the channels are allocated to the STAs so as to minimize channel interference during the data transmission and reception, large-volume data may be normally transmitted and received.

Furthermore, the embodiments of the present invention provide a channel allocation apparatus and method which allocates limited frequency channels to a plurality of STAs corresponding to a plurality of users to transmit and receive large-volume data in a communication system, for example, a WLAN system. More specifically, the channel allocation apparatus and method allocates channels such that the STAs normally transmit and receive data according to various data transmission and reception methods, that is, various transmission modes.

In the embodiments of the present invention, an AP allocates channels to a plurality of STAs according to transmission modes of the STAs in a communication system, for example, a WLAN system, and the STAs normally transmit and receive large-volume data through the allocated channels in the corresponding transmission modes. Here, when the transmission modes of the STAs correspond to a multi user-multi input multi output (MU-MIMO) method, a multi user-frequency division multiplexing (MU-FDM) method, or a multi user-orthogonal frequency division multiple access (OFDM) method, frequency channels are allocated to the STAs according to the transmission modes of the STAs, and data are normally transmitted and received between the AP and the STAs through the allocated frequency channels in the corresponding transmission modes.

In the embodiments of the present invention, when an AP receives terminal information including interference information from a plurality of STAs in a communication system such as a WLAN system, for example, an environment in which IEEE 802.11 systems coexist, the AP allocates channels on the basis of the terminal information to minimize channel interference in frequency channels such that the AP and the STAs normally transmit and receive large-volume data. Now, referring to FIG. 1, a communication system in accordance with an embodiment of the present invention will be described in detail.

FIG. 1 schematically illustrates the architecture of a communication system in accordance with an embodiment of the present invention.

Referring to FIG. 1, the communication system includes first APs 102 and 152 and first STAs 104 and 154 which are included in a first system as a WLAN system and second APs 106 and 156, second STAs 108 and 158, and third STAs 110 and 160 which are included in a second system as the WLAN system.

The first system includes the first APs 102 and 152 and the first STAs 104 and 154 which are configured to transmit and receive data through frequency channels according to a first method, and the second system includes the second APs 106 and 156, the second STAs 108 and 158, and the third STAs 110 and 160 which are configured to transmit and receive data through the frequency channels according to a second method. The first and second systems are included in different networks.

A process in which frequency channels are allocated to the first and second systems will be described in detail. When a first channel with a first frequency bandwidth 120 is allocated to the first system and a second channel with a second frequency bandwidth 130 is allocated to the second system, channel interference occurs in a frequency band 140 at which the first and second channels overlap each other. Due to the channel interference, data may not be normally transmitted and received among the second AP 106, the second STA 108, and the third STA 110 of the second system in the first and second systems, for example. The following descriptions will be focused on the second system, for convenience of description.

First, when the first channel with the first frequency bandwidth 120 allocated to the first system and the second channel with the second frequency bandwidth 130 allocated to the second system overlap each other to cause channel interference in the overlapped frequency band 140, the second STA 108 and the third STA 110 of the second system check the type and position of an interference signal in the overlapped frequency band 140. At this time, the second and third STAs 108 and 110 of the second system checks whether the interference signal corresponds to the first or second system, using a mixed mode preamble. Here, when the energy of the interference signal can be detected but the preamble of the interference signal is not detected, the second and third STAs 108 and 110 of the second system determines that the interference signal corresponds to the first system. Furthermore, the second and third STAs 108 and 110 of the second system transmit the intensity of the interference signal to the second AP 106 for each sub band. That is, the second and third STAs 108 and 110 of the second system transmit terminal information containing interference information on the interference signal to the second AP 106. The terminal information may include the position information of the second and third STAs 108 and 110.

Then, the second AP 106 checks the positions of the second and third STAs 108 and 110 based on the terminal information, and checks the position of an interference source, from which the interference signal is generated, through a triangulation method using the intensity of the interference signal for each sub band. Furthermore, the second AP 106 calculates a total frequency bandwidth occupied by the interference signal and a frequency position of the interference signal through the position profile of the interference source for each sub band. The second AP 106 also checks the type of the interference signal based on the intensity of the interference signal and the bandwidth occupied by the interference signal.

Based on the position of the interference source corresponding to the interference signal, the intensity of the interference signal, the frequency bandwidth occupied by the interference signal, and the frequency position of the interference signal, the channels are allocated to the second and third STAs 108 and 110 so as to avoid interference from the interference signal when the second and third STAs 108 and 110 transmit and receive data. The channel allocation information is transmitted to the second and third STAs 108 and 110, and the second and third STAs 108 and 110 change channels through adaptive bandwidth adjustment according to the received channel allocation information.

Accordingly, the communication system forms a coexistence cell 150 in which the first and second system coexist. At this time, the first AP 152 and the first STA 154 of the first system transmit and receive data through a second channel with a second frequency bandwidth 180, and the second AP 156 and the second and third STAs 158 and 160 transmit and receive data through a first channel with first and third frequency bandwidth 170 and 175.

In the communication system according to the embodiment of the present invention, when the interference information on channel interference occurring during data transmission and reception between the AP and the plurality of STAs, for example, terminal information including the intensity of an interference signal and the like is transmitted from the STAs to the AP, the AP checks the position of an interference source of the interference signal, a frequency bandwidth occupied by the interference signal, a frequency position of the interference signal, and the type of the interference signal based on the interference information, allocates channels in a frequency band avoiding the interference signal to the STAs, and then transmits the channel allocation information to the STAs. Accordingly, the AP and the STAs normally transmit large-volume data through the channels in which channel interference is minimized, based on the channel allocation information. Now, referring to FIGS. 2 and 3, channel allocation corresponding to transmission modes of STAs in a communication system in accordance with the embodiment of the present invention will be described in more detail.

Figure 2:
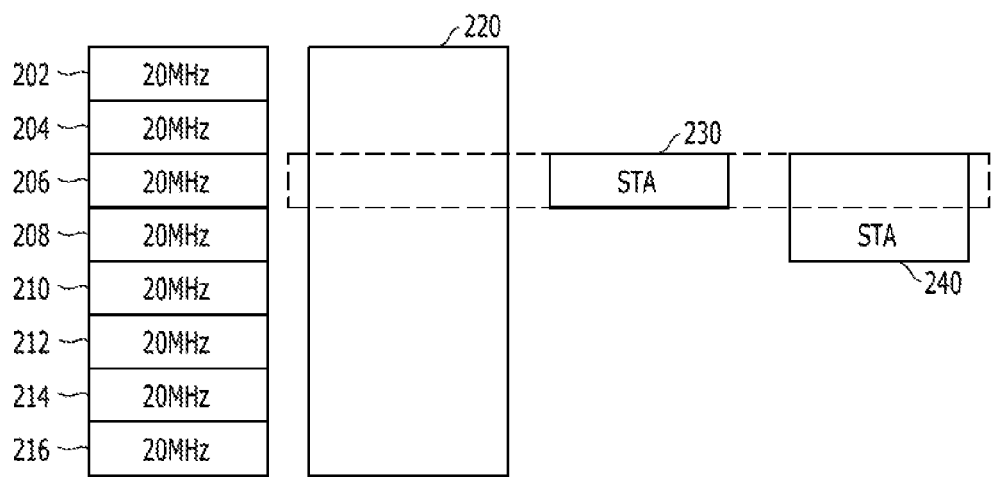
FIGS. 2 and 3 are diagrams for explaining channel allocation in a communication system in accordance with the embodiment of the present invention.
Figure 3:
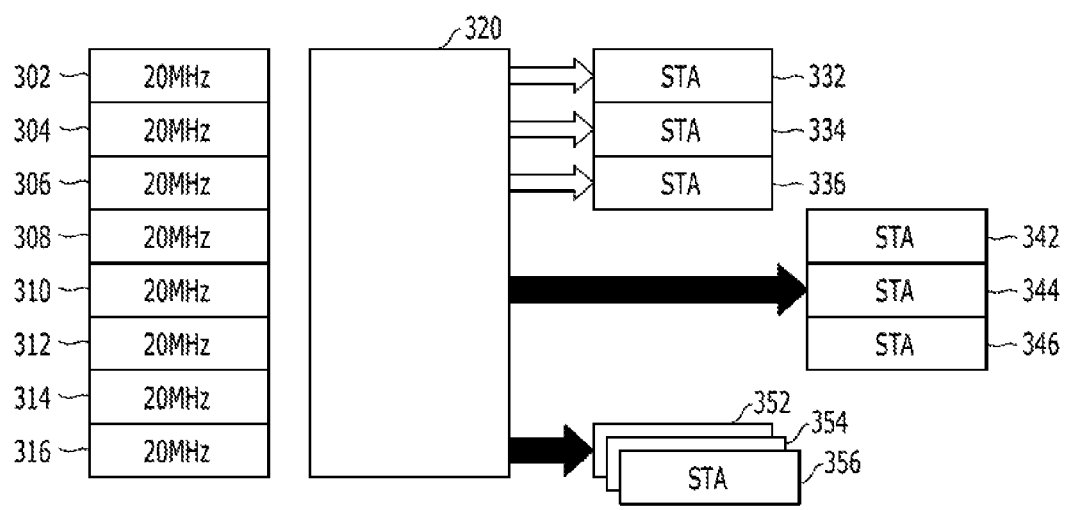

FIGS. 2 and 3 are diagrams for explaining channel allocation in a communication system in accordance with the embodiment of the present invention.

Referring to FIG. 2, the communication system checks a frequency band 220 allocable to a plurality of STAs in an available frequency band including fundamental frequency bands, for example, 20 MHz bands 202, 204, 206, 208, 210, 212, 214, and 216. Then, the communication system allocates a channel of a fundamental frequency band, that is, a 20 MHz band 230 to a first STA and allocates a channel of a 40 MHz band 240 coupled to the adjacent fundamental frequency band to a second STA, according to the transmission modes of the STAs in the allocable frequency band.

Referring to FIG. 3, the channel allocation will be described in more detail. The communication system checks an available frequency band including fundamental frequency bands, for example, 20 MHz bands 302, 304, 306, 308, 310, 312, 314, and 316, and checks a frequency band 320 allocable to the plurality of STAs in the available frequency band, that is, a frequency band 320 allocable as a primary channel to the STAs. Then, the communication system allocates the allocable frequency band 320 to the STAs according to the transmission modes of the STAs.

The communication system classifies the available frequency bands depending on the transmission modes of the STAs. Then, the communication system allocates channels of first frequency bands 332, 334, and 336 to STAs based on a first transmission mode, for example, the MU-FDM method, allocates channels of second frequency bands 342, 344, and 346 to STAs based on a second transmission mode, for example, the MU-OFDM method, and allocates channels of third frequency bands 352, 354, and 346 to STAs in a third transmission mode, for example, the MU-MIMO method. At this time, the communication system allocates channels of a fundamental frequency band, for example, channels of the 20 MHz band to the STAs according to the transmission modes of the STAs or allocates channels of 40 MHz/80 MHz/160 MHz band obtained by expanding the fundamental frequency band, for example, coupling the fundamental frequency band of 20 MHz to the STAs.

The STAs transmit and receive data to and from the AP mode through the channels of the frequency bands allocated in response to their transmission modes, for example, the channels of the 20 Mhz/40 MHz/80 MHz/160 MHz bands, according to the corresponding transmission modes. The communication system checks the frequency band allocable to the STAs in the available frequency band by transmitting and receiving request-to-send (RTS) messages and clear-to-send (CTS) messages to and from the STAs. Now, referring to FIGS. 4 and 5, a procedure of transmitting and receiving RTS/CTS messages in the communication system in accordance with the embodiment of the present invention will be described in more detail.

Figure 4:
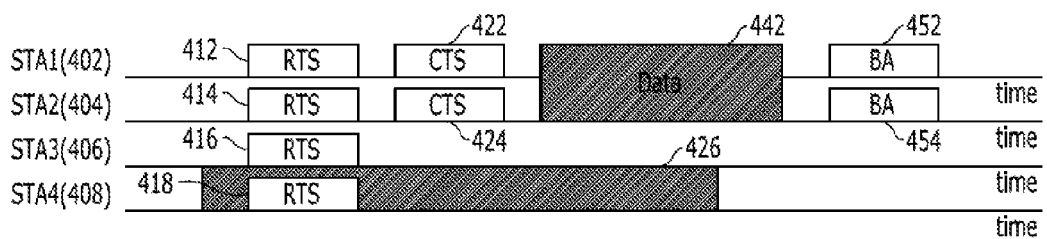
FIGS. 4 and 5 schematically illustrate a transmission and reception flow of RTS/CTS messages in the communication system in accordance with the embodiment of the present invention.
Figure 5:
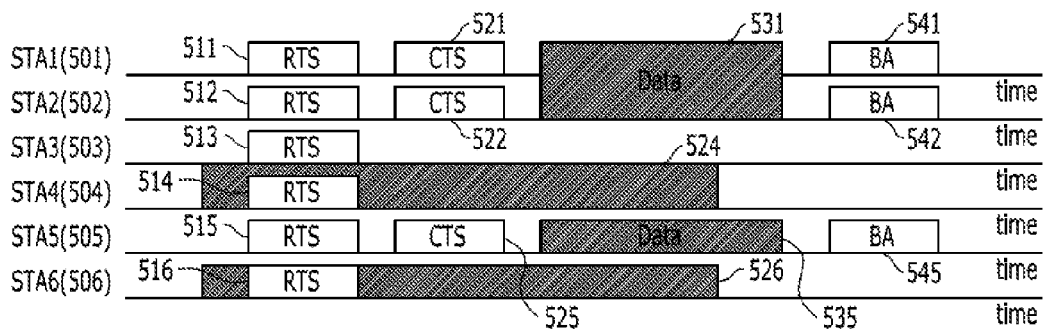

FIGS. 4 and 5 schematically illustrate a transmission and reception flow of RTS/CTS messages in the communication system in accordance with the embodiment of the present invention.

First, referring to FIG. 4, the communication system transmits RTS messages 412, 414, 416, and 418 to a plurality of STAs, for example, STAs 402, 404, 406, and 408, in order to check channels of a frequency band allocable to the STAs according to the transmission mode of the STAs in the available frequency band. Then, among the STAs, STAs in which interference 426 does not exist, for example, the STAs 402 and 404 transmit CTS messages 422 and 424 in response to the RTS messages 412 and 414, and frequency channels corresponding to the transmission modes of the STAs 402 and 404 are allocated to the STAs 402 and 404. Then, data 442 are transmitted and received according to the transmission modes corresponding to the frequency channels. Furthermore, block ACK (BAs) 452 and 454 of the STAs 402 and 404 are transmitted and received in response to the data transmission and reception.

Referring to FIG. 5, the communication system transmits RTS messages 511, 512, 513, 514, 515, and 516 to the STAs, for example, STAs 501, 502, 503, 504, 505, and 506, in order to check channels of the frequency band allocable to the STAs according to the transmission modes of the STAs in the available frequency band, as described with reference to FIG. 4. Then, among the STAS, STAs in which interferences 524 and 526 do not exist, for example, the STA 501, 502, and 505 transmit CTS messages 521, 522, and 525 in response to the RTS messages 511, 512, and 515, frequency channels corresponding to the transmission modes of the STAs 501, 502, and 505 are allocated to the STAs 501, 502, and 505. Then, data 531 and 535 are transmitted and received through the frequency channels according to the corresponding transmission mode. Furthermore, BAs 541, 542, and 545 of the STAs 501, 502, and 505 are transmitted and received in response to the data transmission and reception.

The communication system in accordance with the embodiment of the present invention checks available frequency channels for transmitting and receiving data to and from a plurality of STAS, and allocates frequency channels to the STAS by considering the transmission mode of the STAs in the available frequency channels. In particular, the communication system allocates channels of a fundamental frequency band or channels obtained by expanding the fundamental frequency band to the STAs according to the transmission modes of the STAs. Accordingly, data are normally transmitted to and received from the STAs through the frequency channels allocated in response to the transmission modes of the STAs, for example, the channels of the 20Mhz/40 MHz/80 MHz/160 MHz bands according to the transmission modes of the STAs, for example. Then, referring to FIGS. 6 to 9, channel allocation for frequency bands based on the transmission modes of the STAs in the communication system in accordance with the embodiment of the present invention will be described in detail.

FIGS. 6 to 9 are diagrams for explaining channel allocation for frequency bands in the communication system in accordance with the embodiment of the present invention.

Figure 6:
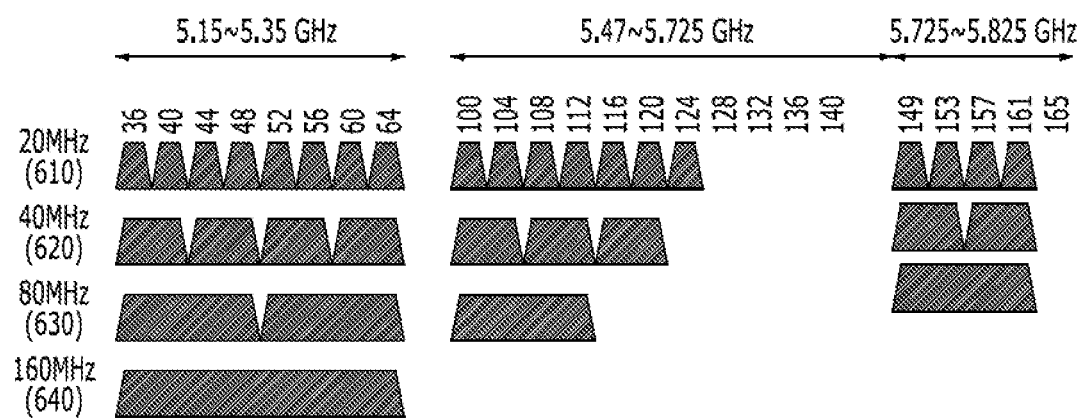
FIGS. 6 to 9 are diagrams for explaining channel allocation for frequency bands in the communication system in accordance with the embodiment of the present invention.

First, referring to FIG. 6, the communication system allocates channels of a fundamental frequency band, for example, a 20 MHz band 610 to a plurality of STAs or allocates channels of 40 MHz band 620/80 MHz band 630/160 MHz band 640 obtained by expanding the fundamental frequency band, for example, the 20 MHz band 610 to the STAs, according to the transmission modes of the STAs. Then, data are transmitted and received through the channels of the 20 Mhz/40 MHz/80 MHz/160 MHz bands 610, 620, 630, and 640 allocated to the STAs in response to the transmission modes of the STAs, according to the transmission modes of the STAs.

Figure 7:
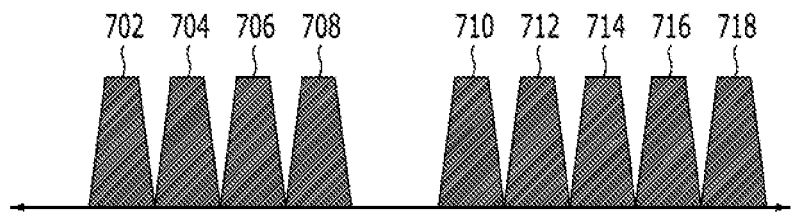

Referring to FIG. 7, the communication system allocates fundamental frequency bands, for example, 20 MHz bands 702, 704, 706, 708, 710, 721, 714, 716, and 718 to a plurality of STAs through spectrum interleaving for the respective STAs, according to the transmission modes of the STAs. For example, according to the transmission modes of the STAs, the communication system allocates channels of first, fourth, and fifth fundamental frequency bands 702, 708, and 710 to a first STA and allocates channels of second, third, and sixth to ninth fundamental frequency band 704, 706, 710, 712, 714, 716, and 718 to a second STA, among the fundamental frequency bands 702, 704, 706, 708, 710, 721, 714, 716, and 718, through spectrum interleaving for the respective STAs.

The communication system divides the available frequency band into fundamental frequency bands when the STAs transmit and receive data, that is, divides the available frequency band into sub bands of the fundamental frequency band, and then allocates the sub bands to the STAs through spectrum interleaving for the respective STAs according to the transmission modes of the STAs. Here, as the frequency bands allocated to the STAs are spread in the available frequency band, the communication system has robustness with respect to channel interference of a specific frequency band.

Figure 8:
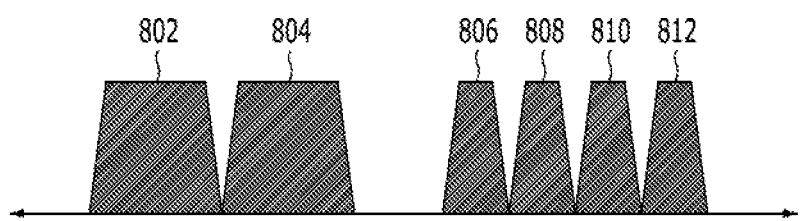

Referring to FIG. 8, the communication system allocates fundamental frequency bands, for example, 20 MHz bands 806, 808, 810, and 812 and frequency bands obtained by expanding the fundamental frequency bands, for example, 40 MHz bands 802 and 804 to a plurality of STAs according to transmission modes of the STAs. For example, among the fundamental frequency bands 806, 808, 810, and 812 and the expanded frequency bands 802 and 804, the communication system allocates channels of the first expanded frequency band 802 and the first fundamental frequency band 806 to a first STA, allocates channels of the second expanded frequency band 804 and the second fundamental frequency band 808 to a second STA, and allocates channels of the third and fourth fundamental frequency bands 810 and 812 to a third STA according to the transmission modes of the STAs.

In this way, the communication system divides an available frequency band into fundamental frequency bands during data transmission and reception of the STAs, that is, divides the available frequency band into sub bands of the fundamental frequency band. Then, the communication system allocates expanded fundamental frequency bands obtained by expanding a part of the sub bands, for example, coupling adjacent sub bands and the fundamental frequency bands to the STAs according to the transmission modes of the STAs. Here, as the communication system allocates channels with various frequency bandwidths to the STAs according to the transmission modes of the STAs, the communication system may support the various transmission modes of the STAs so as to normally transmit and receive data to and from the STAs.

Figure 9:
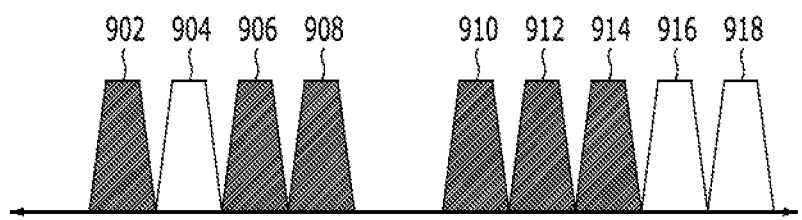

Furthermore, referring to FIG. 9, the communication system allocates fundamental frequency bands, for example, 20 MHz bands 902, 906, 908, 910, and 912 to a plurality of STAs according to transmission modes of the STAs. For example, among the fundamental frequency bands 902, 906, 908, 910, and 912, the communication system allocates channels of first, fourth, and fifth fundamental frequency band 902, 908, and 910 to a first STA, allocates channels of third and seventh fundamental frequency band 906 and 914 to a second STA, and allocates a channel of a sixth fundamental frequency band 912 to a third STA, according to the transmission modes of the STAs. At this time, the communication system checks channel interference through clear channel assessments (CCA) of the STAs, and does not allocate the channels of the second, seventh, and eighth fundamental frequency bands 904, 914, and 918 to the STAs. That is, the communication system minimizes channel interference of the channels allocated to the STAs, based on the CCAs of the STAs. Hereafter, referring to FIG. 10, an AP to allocate channels to a plurality of STAs in the communication system in accordance with the embodiment of the present invention will be described in detail.

Figure 10:
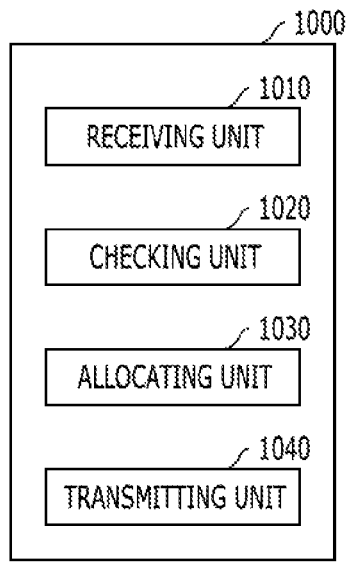
FIG. 10 schematically illustrates the configuration of an AP to allocate channels in the communication system in accordance with the embodiment of the present invention.

FIG. 10 schematically illustrates the configuration of an AP to allocate channels in the communication system in accordance with the embodiment of the present invention.

Referring to FIG. 10, the AP 100 includes a receiving unit 1010, a checking unit 1020, an allocating unit 1030, and a transmitting unit 1040. The receiving unit 1010 is configured to receive information of STAs including interference information on the STAs, that is, terminal information. The checking unit 1020 is configured to check the interference information contained in the terminal information, channels of an available frequency band for the STAs, channels of an allocable frequency band, and transmission modes of the STAs. The allocating unit 1030 is configured to allocate the channels of the available frequency band to the STAs based on the interference information and the transmission modes of the STAs. The transmitting unit 1040 is configured to transmit the channel allocation information on the channels allocated to the STAs to the STAs.

Here, while transmitting and receiving RST messages and CTS messages to and from the STAs, the AP checks the channels of the frequency band available for the STAs and the channels of the frequency band allocable to the STAs, and checks an interference signal of the STAs through the interference information contained in the terminal information, for example, checks the position of an interference source of an interference signal corresponding to channel interference, a frequency bandwidth occupied by the interference signal, a frequency position of the interference signal, and the type of the interference signal. Furthermore, the terminal information may contain information on the transmission modes of the STAs, and the AP checks the transmission modes of the STAs through the terminal information.

Furthermore, the AP minimizes channel interference in the channels of the frequency band available for the STAs and the channels of the allocable frequency band, based on the interference information. Furthermore, the AP allocates the channels of the frequency band corresponding to the transmission modes of the STAs to the STAs, and transmits and receives large-volume data to and from the STAs. Here, since the channel allocation for the frequency band to the STAs has been described in detail, the detailed descriptions thereof are omitted herein. Now, referring to FIG. 11, the operation of the AP to allocate channels to the plurality of STAs in the communication system in accordance with the embodiment of the present invention will be described in detail.

Figure 11:
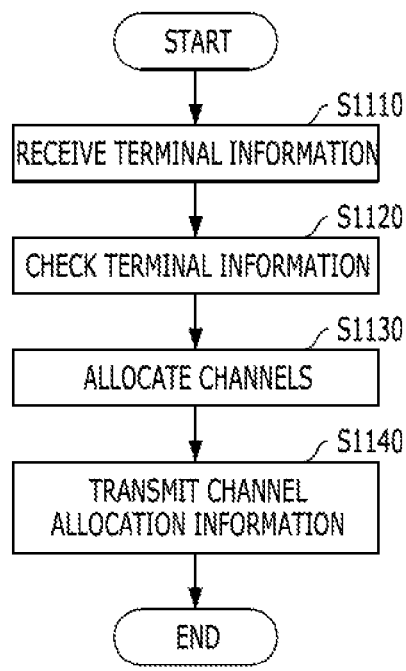
FIG. 11 is a flowchart schematically showing a channel allocation process of an AP in the communication system in accordance with the embodiment of the present invention.

FIG. 11 is a flowchart schematically showing a channel allocation process of an AP in the communication system in accordance with the embodiment of the present invention.

Referring to FIG. 11, the AP receives information of STAs containing interference information on the STAs, that is, terminal information, at step S1110.

At step S1120, the AP checks the interference information contained in the terminal information, channels of a frequency band available for the STAs, channels of an allocable frequency band, and transmission modes of the STAs. At step S1130, the AP allocates the channels of the available frequency band to the STAs, based on the interference information and the transmission modes of the STAs.

At step S1140, the AP transmits the channel allocation information on the channels allocated to the STAs to the STAs, and transmits and receives data through the channels allocated to the STAs, according to the transmission modes of the STAs.

Here, while transmitting and receiving RST messages and CTS messages to and from the STAs, the AP checks the channels of the frequency band available for the STAs and the channels of the frequency band allocable to the STAs, and checks an interference signal of the STAs through the interference information contained in the terminal information, for example, checks the position of an interference source of an interference signal corresponding to channel interference, a frequency bandwidth occupied by the interference signal, a frequency position of the interference signal, and the type of the interference signal. Furthermore, the terminal information may contain information on the transmission modes of the STAs, and the AP checks the transmission modes of the STAs through the terminal information.

Furthermore, the AP minimizes channel interference in the channels of the frequency band available for the STAs and the channels of the allocable frequency band, based on the interference information. Furthermore, the AP allocates the channels of the frequency band corresponding to the transmission modes of the STAs to the STAs, and transmits and receives large-volume data to and from the STAs. Here, since the channel allocation for the frequency band to the STAs has been described in detail, the detailed descriptions thereof are omitted herein. Now, referring to FIG. 12, the plurality of STAs in the communication system in accordance with the embodiment of the present invention will be described in more detail.

Figure 12:
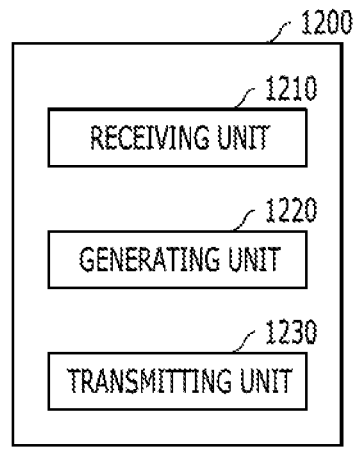
FIG. 12 schematically illustrates the configuration of STAs receiving channels in the communication system in accordance with the embodiment of the present invention.

FIG. 12 schematically illustrates the configuration of STAs receiving channels in the communication system in accordance with the embodiment of the present invention.

Referring to FIG. 12, the STA 1200 includes a receiving unit 1210, a generating unit 1220, and a transmitting unit 1230. The receiving unit 1210 is configured to receive an interference signal at a channel of a frequency band available for the STA in the communication system. The generating unit 1220 is configured to generate terminal information containing interference information corresponding to the interference signal. The transmitting unit 1230 is configured to transmit the terminal information to the AP.

The STA transmits and receives RTS messages and CTS messages to and from the AP such that the AP checks channels of a frequency band available for the STAs and channels of a frequency band allocable to the STAs. Furthermore, the STA contains information on a transmission mode of the STA into terminal information including the interference information, and transmits the terminal information to the AP.

Furthermore, the STA receives a channel of a frequency band, in which channel interference is minimized based on the interference information and which corresponds to the transmission mode of the STA among the channels of the available frequency band and the channels of the allocable frequency band, from the AP. That is, the STA receives channel allocation information on the received channel of the frequency band from the AP, and transmits and receives data to and from the AP through the received channel of the frequency band according to the transmission mode. Here, since the channel allocation for the frequency band to the STAs has been described above, the detailed descriptions thereof are omitted herein. Now, referring to FIG. 13, the operation of the STAs to receive channels in the communication system in accordance with the embodiment of the present invention will be described in more detail.

Figure 13:
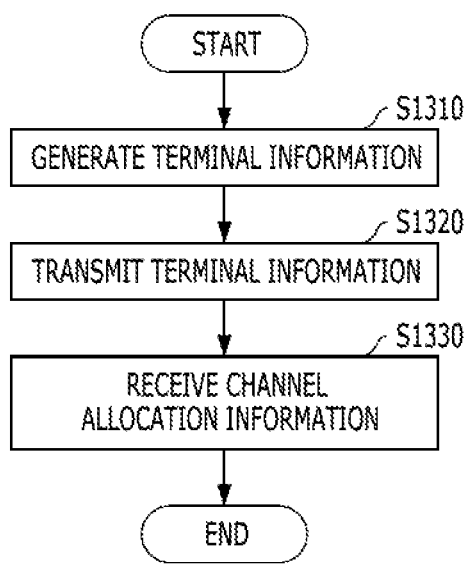
FIG. 13 is a flowchart schematically showing an operation of STAs to receive channels in the communication system in accordance with the embodiment of the present invention.

FIG. 13 is a flowchart schematically showing an operation of STAs to receive channels in the communication system in accordance with the embodiment of the present invention.

Referring to FIG. 13, the STA receives an interference signal at a channel of a frequency band available for the STA in the communication system, and generates terminal information containing interference information corresponding to the interference signal, at step S1310.

At step S1320, the STA transmits the generated terminal information to the AP. At step S1330, the AP receives channel allocation information on the channel of the frequency band allocated to the STA from the AP, based on the terminal information.

The STA transmits and receives RTS messages and CTS messages to and from the AP such that the AP checks channels of a frequency band available for the STAs and channels of a frequency band allocable to the STAs. Furthermore, the STA contains information on a transmission mode of the STA into terminal information including the interference information, and transmits the terminal information to the AP.

Furthermore, the STA receives a channel of a frequency band, in which channel interference is minimized based on the interference information and which corresponds to the transmission mode of the STA among the channels of the available frequency band and the channels of the allocable frequency band, from the AP. The STA transmits and receives data to and from the AP through the received channel of the frequency band according to the transmission mode. Here, since the channel allocation for the frequency band to the STAs has been described above, the detailed descriptions thereof are omitted herein.

In the embodiments of the present invention, the communication system allocates frequency channels to the STAs in consideration of the transmission modes of the STAs, and supports the transmission modes of the STAs. Accordingly, the communication system may normally transmit and receive large-volume data to and from STAs having various transmission modes through the frequency channels in the various transmission modes.

Furthermore, the communication system allocates channels to a plurality of STAs based on the interference information on the STAs, thereby minimizing channel interference at the channels allocated to the STAs. Accordingly, when data are transmitted and received through the channels allocated to the STAs, channel interference at the allocated channels may be minimized to normally transmit and receive large-volume data. Accordingly, data transmission and reception performance through limited frequency channels may be improved, and the use efficiency of the limited frequency channels may be maximized.

While the present invention has been described with respect to the specific embodiments, it will be apparent to those skilled in the art that various changes and modifications may be made without departing from the spirit and scope of the invention as defined in the following claims.

What is claimed is:

1. A channel allocation apparatus in a communication system, comprising:
   a receiving unit configured to receive terminal information containing transmission mode information of a plurality of stations (STAs) from the STAs;
   a checking unit configured to check transmission modes of the STAs and check a frequency band available for the STAs;
   an allocating unit configured to allocate channels of an allocable frequency band in the available frequency band to the STAs, according to the transmission modes of the STAs; and
   a transmitting unit configured to transmit channel allocation information on the channels allocated to the STAs to the STAs,
   wherein the allocating unit divides the available frequency band into a plurality of fundamental frequency bands according to the transmission modes of the STAs, and allocates channels of the fundamental frequency bands to the STAs,
   wherein the terminal information includes interference information corresponding to channel information of the STAs,
   wherein the checking unit checks, using triangulation based on the interference information, the position of an interference source of an interference signal corresponding to channel interference, and
   wherein the allocating unit allocates channels of a frequency and avoiding the interference signal in the available frequency band to the STAs.

2. The channel allocation apparatus of claim 1, wherein the allocating unit allocates the fundamental frequency bands to the STAs through spectrum interleaving for the respective STAs.

3. The channel allocation apparatus of claim 1, wherein the allocating unit allocates expanded fundamental frequency bands, obtained by coupling adjacent fundamental frequency bands among the fundamental frequency bands, to the STAs.

4. The channel allocation apparatus of claim 1, wherein the allocating unit allocates fundamental frequency bands, in which channel interference does not occur among the fundamental frequency bands, to the STAs.

5. The channel allocation apparatus of claim 1, wherein the checking unit further checks a frequency bandwidth occupied by the interference signal, a frequency position occupied by the interference signal, and the type of the interference signal, based on the interference information.

6. The channel allocation apparatus of claim 1, wherein the checking unit checks the frequency band available for the STAs, using whether or not request-to-send (RTS) messages and clear-to-send (CTS) messages are transmitted to and received from the STAs.

7. The channel allocation apparatus of claim 1, wherein the allocating unit classifies the available frequency band for the respective transmission modes of the STAs, and allocates the channels of the allocable frequency band to the STAs.

8. A channel receiving apparatus in a communication system, comprising:
   a receiving unit configured to receive an interference signal corresponding to channel interference of a plurality of stations (STAs);
   a generating unit configured to generate interference information corresponding to the interference signal and terminal information containing transmission mode information of the STAs; and
   a transmitting unit configured to transmit the terminal information to an access point (AP),
   wherein the interference information includes intensity information of the interference signal, wherein the receiving unit receives channel allocation information on channels of a frequency band allocated to the STAs according to the interference information, a position of an interference source determined using triangulation based on the interference information, and the transmission mode information, in a frequency band available for the STAs, and wherein the channels of the frequency band allocated to the STAs are determined by dividing the available frequency band into a plurality of fundamental frequency bands according to the transmission modes of the STAs, and allocating channels of the fundamental frequency bands to the STAs.

9. The channel receiving apparatus of claim 8, wherein the frequency band available for the STAs is checked in response to whether or not request-to-send (RTS) messages and clear-to-send (CTS) messages are transmitted to and received from the access point.

10. A channel allocation method in a communication system, comprising:
receiving terminal information containing transmission mode information of a plurality of stations (STAs) from the STAs;
checking transmission modes of the STAs and checking a frequency band available for the STAs;
allocating channels of an allocable frequency band to the STAs in the available frequency band according to the transmission modes of the STAs; and
transmitting channel allocation information on the channels allocated to the STAs to the STAs,
wherein said allocating the channels of the allocable frequency band to the STAs in the available frequency band according to the transmission modes of the STAs comprises dividing the available frequency band into a plurality of fundamental frequency bands and then allocating channels of the fundamental frequency bands to the STAs, according to the transmission modes of the STAs,
wherein the terminal information includes interference information corresponding to channel interference of the STAs,
wherein said checking the transmission modes of the STAs and checking the frequency band available for the STAs comprises checking, using triangulation based on the interference information, the position of an interference source of an interference signal corresponding to channel interference, and
wherein said allocating the channels of the allocable frequency band to the STAs in the available frequency band according to the transmission modes of the STAs comprises allocating channels of a frequency band avoiding the interference signal in the available frequency band to the STAs.

11. The channel allocation method of claim 10, wherein said allocating the channels of the allocable frequency band to the STAs in the available frequency band according to the transmission modes of the STAs comprises allocating the fundamental frequency bands to the STAs through spectrum interleaving for the respective STAs.

12. The channel allocation method of claim 10, wherein said allocating the channels of the allocable frequency band to the STAs in the available frequency band according to the transmission modes of the STAs comprises allocating fundamental frequency bands expanded by coupling adjacent fundamental frequency bands to the STAs, among the fundamental frequency bands.

13. The channel allocation method of claim 10, wherein said allocating the channels of the allocable frequency band to the STAs in the available frequency band according to the transmission modes of the STAs comprises allocating fundamental frequency bands, in which channel interference does not occur among the fundamental frequency bands, to the STAs.

14. The channel allocation method of claim 10, wherein said checking the transmission modes of the STAs and checking the frequency band available for the STAs further comprises checking a bandwidth occupied by the interference signal, a frequency position occupied by the interference signal, and the type of the interference signal, based on the interference information.

15. The channel allocation method of claim 10, wherein said checking the transmission modes of the STAs and checking the frequency band available for the STAs comprises checks the frequency band available for the STAs, using whether or not request-to-send (RTS) messages and clear-to-send (CTS) message are transmitted to and received from the STAs.

16. The channel allocation method of claim 10, wherein said allocating the channels of the allocable frequency band to the STAs in the available frequency band according to the transmission modes of the STAs comprises classifying the available frequency band for the respective transmission modes of the STAs, and then allocating channels of the allocable frequency band to the STAs.

17. A channel receiving method in a communication system, comprising:
receiving an interference signal corresponding to channel interference of a plurality of stations (STAs);
generating interference information corresponding to the interference signal and terminal information containing transmission mode information of the STAs; and
transmitting the terminal information to an access point (AP),
wherein the interference information includes intensity information of the interference signal,
wherein said receiving the interference signal corresponding to the channel interference of the plurality of STAs comprises receiving channel allocation information on channels of a frequency band allocated to the STAs in a frequency band available for the STAs according to the interference information, a position of an interference source determined using triangulation based on the interference information, and the transmission mode information,
and wherein the channels of the frequency band allocated to the STAs are determined by dividing the available frequency band into a plurality of fundamental frequency bands according to the transmission modes of the STAs, and allocating channels of the fundamental frequency bands to the STAs.

18. The channel receiving method of claim 17, wherein the frequency band available for the STAs is checked in response to whether or not request-to-send (RTS) messages and clear-to-send (CTS) messages are transmitted to and received from the AP.

* * * * *